United States Patent [19]
Crowley

[11] Patent Number: 5,408,957
[45] Date of Patent: Apr. 25, 1995

[54] CONTINUOUS COMBUSTIBLE GAS INJECTION INTO CONVENTIONALLY FUELED INTERNAL COMBUSTION ENGINES

[76] Inventor: Timothy J. Crowley, 1031 Post Rd., Darien, Conn. 06820

[21] Appl. No.: 54,792

[22] Filed: Apr. 28, 1993

[51] Int. Cl.6 ............................................. F02B 3/00
[52] U.S. Cl. .................... 123/27 GE; 123/526
[58] Field of Search .............. 123/698, 525, 526, 527, 123/575, 27 GE

[56] References Cited

U.S. PATENT DOCUMENTS

| | | | |
|---|---|---|---|
| 4,227,497 | 10/1980 | Mathieson | 123/525 |
| 4,369,751 | 1/1983 | Batchelor et al. | 123/525 |
| 4,450,821 | 5/1984 | Venning et al. | 123/575 |
| 4,541,397 | 9/1985 | Young | 123/525 |
| 4,637,353 | 1/1987 | Codrington | 123/526 |
| 4,638,783 | 1/1987 | Snyder | 123/27 GE |
| 4,641,625 | 2/1987 | Smith | 123/575 |
| 4,909,209 | 3/1990 | Takahasi | 123/27 GE |
| 5,092,305 | 3/1992 | King | 123/575 |

FOREIGN PATENT DOCUMENTS

| | | | |
|---|---|---|---|
| 0179349 | 11/1982 | Japan | 123/525 |
| 0082556 | 5/1984 | Japan | 123/525 |
| 4259651 | 9/1992 | Japan | 123/525 |

Primary Examiner—E. Rollins Cross
Assistant Examiner—Erick Solis
Attorney, Agent, or Firm—F. Eugene Davis, IV

[57] ABSTRACT

Liquefied petroleum gas (propane), natural gas, hydrogen gas, or the like, is continuously injected at substantially constant pressure into the air intake manifold, or air induction system, of a conventional internal combustion engine, the engine being electronically, or mechanically, controlled to adjust the air to liquid fuel mixture to a optimum value. The engine may use liquid gasoline, methanol, diesel, or any other, primary fuel. When retrofitted to a conventional 2 or 4 stroke, spark or compression ignited engine, the gaseous fuel preferable is supplied from a reservoir where it is stored in liquefied or compressed form through an appropriate pressure control valve to a pipe T installed in the crankcase ventilation pipe. The supply of gaseous fuel is controlled by an ON-OFF solenoid valves which are only operated when the alternator or generator of the engine is running and the engine has attained a predetermined temperature. A thermostatic switch in series between the generator and the solenoid valves and located in the lower radiator flow pipe may be employed for this purpose. The pressure of the gas supplied to the engine is adjusted at idle with the engine at normal temperature. The pressure is set between pressures at which the engine runs rough and pollutes excessively.

20 Claims, 5 Drawing Sheets

CONTINUOUS COMBUSTIBLE GAS INJECTION INTO CONVENTIONALLY FUELED INTERNAL COMBUSTION ENGINES

TECHNICAL FIELD

This invention relates to continuous combustible gas injection into conventionally fueled internal combustion engines. More particularly, it relates to systems employing liquefied petroleum, compressed natural gas, compressed hydrogen, or the like. The invention further relates to internal combustion engines that are under automatic control, such as gasoline engines electronically controlled in response to an exhaust oxygen sensor to adjust the air liquid fuel ratio, and to diesel engines so governed or governed by conventional rotational speed governors.

BACKGROUND ART

A number of systems have been proposed for utilizing gaseous and liquid fuels in internal combustion engines, but many devices have involved complex changes to the engine with complex controls and switches which are not user friendly. One device disclosed in U.S. Pat. No. 4,068,639, suggests the use of a gaseous fuel reservoir and manual switching controls. U.S. Pat. No. 3,753,424 injects a gaseous fuel only at load conditions of the engine and not at a constant pressure as in the present invention. U.S. Pat. Nos. 3,718,000, 2,381,304, and 3,659,574 use either a gaseous fuel or a liquid fuel but never both at the same time.

The system disclosed in U.S. Pat. No. 4,373,493 utilizes a gaseous fuel injected into a liquid fuel carburetor. It varies the amount of gaseous fuel flow with engine load and injects an additional amount of atmospheric air mixed into the gaseous fuel port. This system requires shutting off the supply of liquid fuel at idle and requires the engine to operate at idle on only the gaseous fuel, unlike the present invention which only substitutes a portion of the liquid fuel with gaseous fuel at idle.

Consequently if an air conditioner or other intermittent devices such as fans, radios, lights, etc., are operated at idle the engine may stall or the idle has to be set higher than normal to prevent stalling, thus decreasing fuel efficiency.

The system disclosed in U.S. Pat. No. 4,373,493 being open to the atmosphere permits leakage of gaseous fuel to the atmosphere.

DISCLOSURE OF THE INVENTION

The present invention may be applied to two or four stroke or rotary internal combustion engines or turbines that utilize a primary fuel. It may be conveniently retrofitted to any internal combustion engine having an air induction vacuum system into which the gaseous fuel may be introduced at a low constant pressure.

In OEM applications, the gaseous fuel may be introduced at a higher pressure into the primary fuel line. Mixing means may be employed to thoroughly mix the fuels before injection into the combustion chamber. This means could, for example, be an ultrasonic mixer either externally powered or using an ultrasonic whistle. The secondary gaseous fuel is utilized as a supplement to assist in the vaporization of the primary fuel so as to enhance the wave of combustion. The invention reduces pollutant emissions and increases engine operating efficiency.

In the retrofit applications, described in detail herein, the gaseous fuel such as propane, natural gas, hydrogen or any other combustible gaseous fuel is injected into the engine's existing air induction or intake manifold system. The gaseous fuel is stored in liquid or compressed form in a tank which may be installed at the rear of an automobile or behind the cab of a truck. The gas is supplied from the storage tank to an appropriate pressure reducing regulator valve, then through a safety valve or valve which only allows the gas to pass if it is between a lower and an upper pressure limit, and then to a pair of solenoid operated valves. When the solenoid operated valves are opened, the gas is supplied at a substantially constant pressure to the intake manifold or air induction manifold of the internal combustion engine. Preferably in conventional automobiles, this is achieved by employing a T-shaped pipe fitting placed in the recirculating pipe for engine gases connected between the PCV valve and the intake manifold. The solenoid valves are located at either end of the gaseous fuel line, i.e., one at the engine and one at the gaseous fuel tank to prevent escape of gaseous fuel from the fuel line when the engine is off.

The gaseous fuel is supplied only when the engine is running and has achieved a minimum temperature. In add-on systems to existing automobiles and trucks, this is accomplished by connecting an electric line from the generator or alternator through a thermostatically operated switch connected to the solenoid valves. The switch operates the solenoids when the thermostatic switch operates at a predetermined temperature, which may be, for example, 125° F. The thermostatically operated switch may be conveniently located in the lower coolant line connected to the radiator. The switch is conventional and may be the same type of switch as utilized to supply information to an electronic control unit or to control an electric cooling fan in a conventional engine.

In engines provided with electronic control modules, an oxygen sensor is employed which senses the oxygen in the exhaust gases and adjusts the air fuel mixture utilized by the engine. This is usually accomplished by primarily controlling the amount of fuel supplied to the engine; the amount of air being supplied to each cylinder during each stroke being controlled primarily by the throttle. This means that the negative pressure in the air intake manifold does not vary greatly during normal driving. For most engines it is approximately 18" Hg. I supply, according to my invention, a gaseous fuel at approximately a positive 18 pounds per square inch to the air intake manifold. Thus, at any given engine operating condition the $O_2$ sensor will reduce the amount of primary fuel supplied or increase the air intake to adjust the oxygen content of the exhaust to a predetermined limit. These control units in a gasoline engine are usually set to an air fuel mixture ratio of 14.5–14.7. Ideally, using my system, this ratio may be adjusted to 15.1–18.5 to provide a leaner burn and a cleaner exhaust than would otherwise be achieved. However, even if the preset air to fuel ratio is not adjusted, substantially decreased hydrocarbon, carbon monoxide, and nitrous oxide emissions are achieved in using my system. Furthermore, the engine efficiency is increased.

In the newer diesel systems employing electronic control, the same operating conditions may be achieved. In conventional diesel engines liquid fuel delivery is controlled by a governor. The vehicle's accelerator is connected to the governor set point, which sets the engine's maximum operating speed. Since the introduction of gaseous fuel into the air induction system will automatically tend to speed up the engine, the governor will reduce the liquid fuel flow to the injectors. I have found that the addition of a constant flow of gaseous fuel to a diesel obtains a significant reduction in engine clatter which is related to ignition lag. The worse the ignition lag, the greater the chatter.

Thus the present invention injects a gaseous fuel at a constant pressure directly into the engine's air induction system, air intake manifold, conventional fuel line, or directly into the combustion chamber, and allows the engine's own management system to adjust the flow of liquid fuel at load and idle, as well as optimize the liquid fuel flow for the best air to fuel mixture.

When my invention is installed in an existing automobile, for example, having a gasoline engine, I adjust the pressure regulator to supply gaseous fuel at idle with the engine at its normal operating temperature. If the pressure is too low the engine will idle in its normal rough manner. If the pressure is too high it will also run rough. In both cases the deleterious exhaust emissions will be excessive. For an inlet orifice of 0.025/inch diameter I find a pressure between 15 and 19 pounds per square inch to be appropriate, usually about 18 pounds per square inch. At this flow rate (approximately 4.8 liters per minute), the engine runs smoother and quieter, at idle, than when supplied with only gasoline. This means that the engine is burning the fuel supplied to it more efficiently.

When installed in a diesel vehicle, smoother operation (less chatter) at idle at a specific pressure (i.e. flow rate) is also achieved. This again indicates increased fuel efficiency.

OBJECTS OF THE INVENTION

It is therefore an object of the invention to provide improved gas injection into liquid fueled internal combustion engines.

Another object of the invention is to provide such a system operating at substantially constant pressure.

Yet another object of the invention is to provide such a system operating under substantially continuous flow conditions.

Still another object of the invention is to provide such a system only operating when the engine is operating and has attained a predetermined minimum temperature.

A further object of the invention is to provide such a system that may be added to an existing internal combustion engine, with or without adjustment of its control system.

Another object of the invention is to provide a flat tank for storing gaseous fuel.

Yet another object of the invention is to provide a gasifier for a system of the above character.

A still further object of the invention is to increase fuel efficiency in internal combustion engines.

A yet further object of the invention is to decrease deleterious emissions from internal combustion engines.

Other objects of the invention will in part be obvious and will in part appear hereinafter.

The invention accordingly comprises the features of construction, elements and arrangement of parts, articles of manufacture possessing the features, properties and relation of elements and a method comprising one or more steps and the relationship of such steps to the others, all of which will be exemplified in the articles, constructions and methods hereinafter described. The scope of the invention will be indicated in the claims.

BRIEF DESCRIPTION OF THE DRAWINGS

For a fuller understanding of the nature and objects of the invention, reference should be had to the following detailed description, taken in connection With the accompanying drawings, in which.

The same reference characters refer to the same elements throughout the several views of the drawings.

BEST MODE FOR CARRYING OUT THE INVENTION

Figure 1:
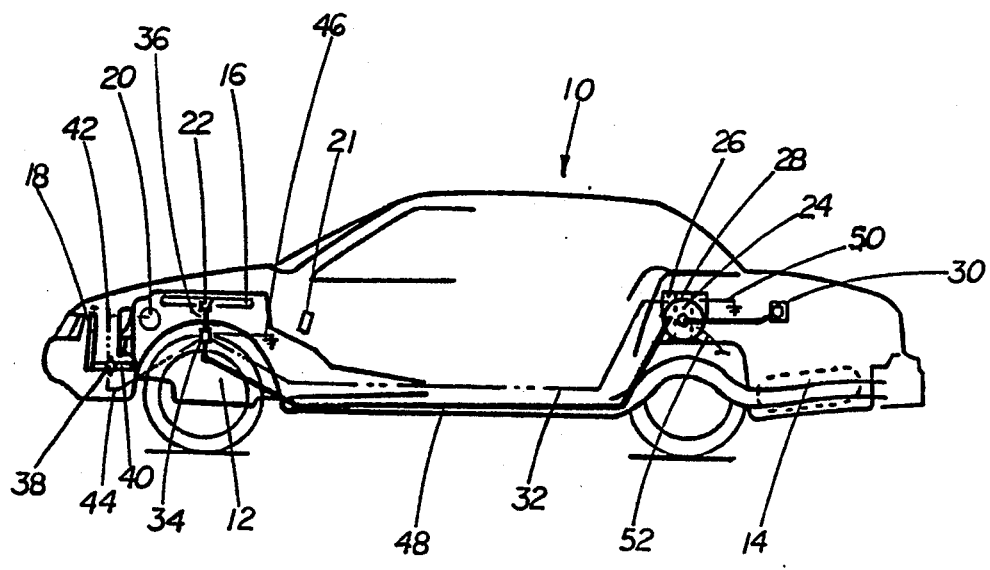
FIG. 1 is a diagrammatic side view of the invention retrofitted in a conventional automobile.

Now referring to FIG. 1, there is shown a conventional automobile generally indicated at 10 having an engine 12 and an engine fuel storage tank 14. The engine is supplied with an air intake manifold 16, radiator 18, alternator 20, and electronic control module 21.

According to the invention, I provide a secondary gaseous fuel tank 24 and control module 26 held down by strap 28. The tank 24 is provided with a gaseous fuel fill connector and line generally indicated at 30. Gaseous fuel is supplied via gaseous fuel pipe 48 to a solenoid operated valve 34 and then via gaseous fuel pipe 36 to orifice 22 into the engine intake manifold 16.

The control module 26 contains controls for controlling the supply and pressure of the gaseous fuel in the gaseous fuel line 48 and gaseous fuel is only supplied through line 36 and orifice 22 to the intake manifold 16 when the engine is turned on and has reached a predetermined temperature. This accomplished by placing a thermostatic switch 38 in the lower coolant line 40 between the radiator 18 and the engine 12. The thermostatic switch 38 is connected in series between the alternator 20 via electric lines 42 and 44 to the solenoid control valve 34. The thermostatic switch 38 is set to close at a predetermined temperature; for example, 125° F., thus gaseous fuel will be fed through orifice 22 by opening the solenoid valve 34 only when the engine is running and has reached this normal operating temperature. The circuit between the alternator and the thermostatic switch 38 is completed by a ground generally indicated at 46. The tank 24 is provided with an excess pressure overflow pipe and outlet, generally indicated at 52, directed as required by the gaseous fuel being used.

Figure 2:
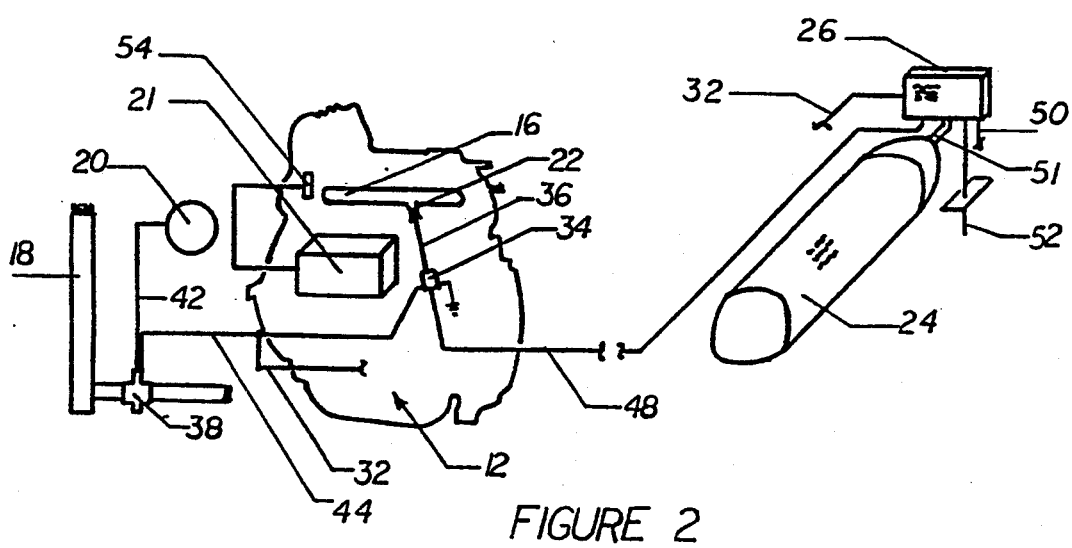
FIG. 2 is a diagrammatic view of the invention shown in FIG. 1.

Now referring to FIG. 2, the liquid fuel air ratio is under control of the electronic module 21 and depends upon the signal received from the oxygen sensor 54 which is located in the exhaust manifold (not shown).

Figure 5:
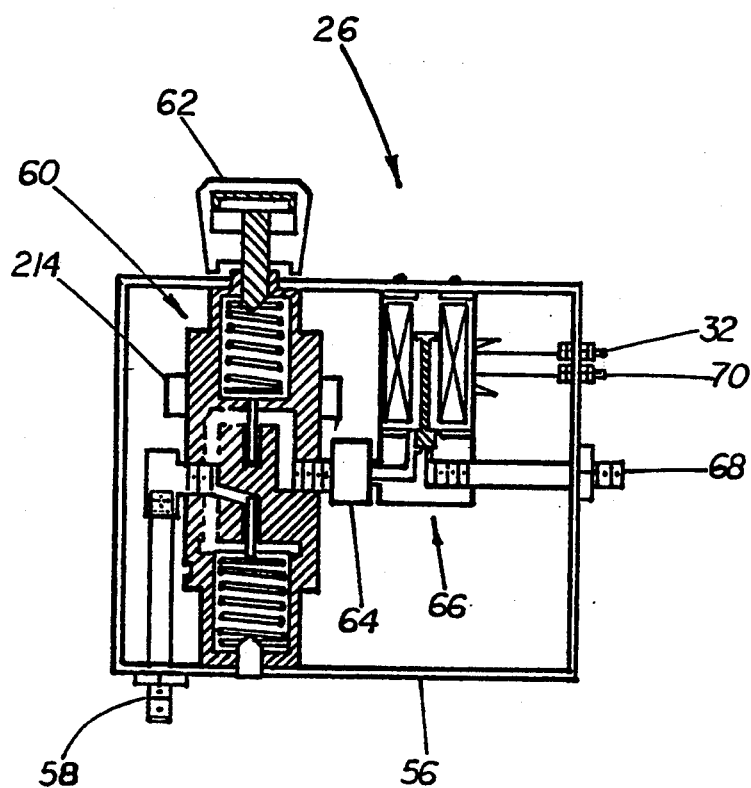
FIG. 5 is a cross-sectional view of the control unit of the invention shown in FIG. 1.

Now referring to FIG. 5, the control unit is generally indicated at 26. It comprises a housing 56. A gas input fitting 58 is connected via appropriate tubing (not shown) to the gaseous fuel storage tank 24 (see FIGS. 1 and 2) and is there supplied to a conventional regulator valve 60 provided with pressure control knob 62. The gaseous fuel is then fed from the regulator valve 60 through a safety valve 64 to the solenoid actuated valve 66 and passes out of the unit 26 through fitting 68 which is connected to the gaseous fuel 48 (see FIGS. 1 and 2).

The solenoid control valve 66 is connected to ground at terminal 70 and to electrical line 32 which in turn is connected to electrical line 44 (see FIG. 1), and thus to the thermostatic switch 38.

By employing two solenoid valves, one 66 at the control unit 26, and another 34 adjacent to where the gaseous fuel is injected into the automobile engine (see FIGS. 1 and 2), I automatically close off the gaseous fuel line 48 when gaseous fuel is not being supplied to the engine 12 and thus assure that no gaseous fuel escapes from line 36 which occurs in some of the systems in the prior art, where the gaseous fuel is supplied through a jet partially open to the atmosphere.

The safety valve 64 prevents gaseous fuel from passing from the regulator 60 to the solenoid operated valve 66 if the pressure of the gaseous fuel is too low or too high, thus insuring that the gaseous fuel is supplied to the engine 12 within predetermined pressure limits.

When the system according to my invention is installed on a conventional automobile as indicated in FIG. 1, 2, and 5, I allow the engine 12 to come to operating temperature and then, while the engine is idling and all accessory equipment turned off, I adjust the regulator valve 60 by turning the knob 62 until the engine runs smoother, but I do not allow the pressure to go so high as the engine again becomes rough running. Thus, I adjust the regulator valve 60 by means of the control knob 62 for smoothest running at idle. This appears to occur when the gaseous fuel is supplying approximately 20% of the fuel requirements of the engine 12 and for conventional gasoline automobile engine this pressure is about 18 pounds per square inch.

Figure 3:
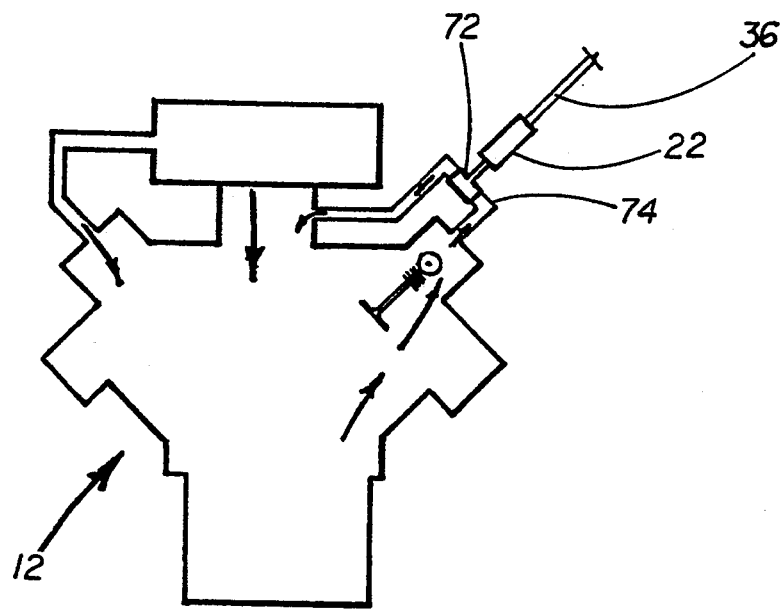
FIG. 3 is a diagrammatic view of a conventional engine showing how the gaseous fuel may be supplied thereto.

Now referring to FIG. 3, according to my invention, the gaseous fuel line 36 is connected through orifice 22 to a T pipe connector 72 which I locate in the gasoline vapor recirculation pipe 74 of the engine 12.

Figure 4:
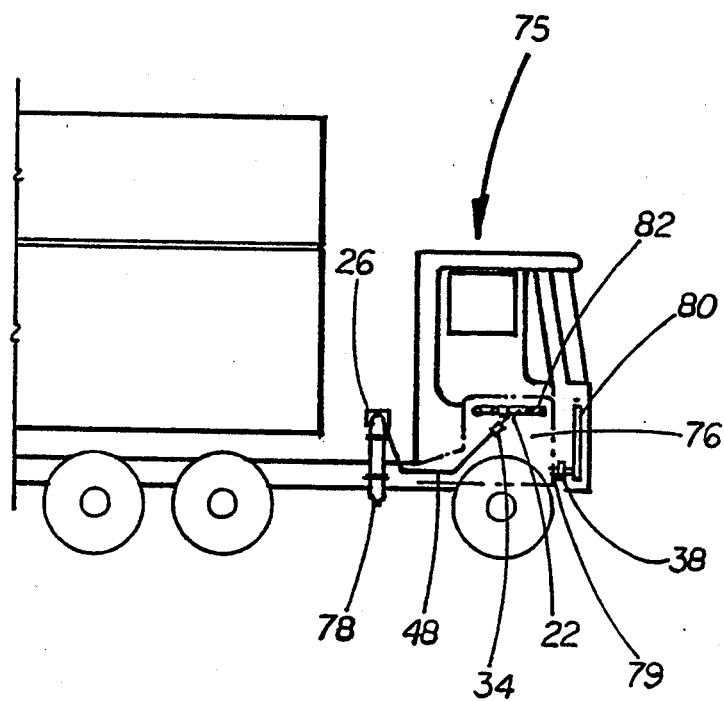
FIG. 4 is a diagrammatic view of the invention retrofitted on a diesel tractor trailer.

Now referring to FIG. 4 wherein there is shown a truck generally indicated at 75, having a diesel engine generally indicated at 76, the retrofit gaseous supply unit again comprises a tank 78, a control unit 26, gaseous fuel line 48 supplied to solenoid valve 34, the operation of which is controlled by a thermostatic switch 38 installed in the lower coolant conduit 79 to the radiator 80. When the engine is running and at its operating temperature, gaseous fuel is supplied from the tank 78 through the control unit 26 and through solenoid valve 34 to the orifice 22, where it is injected into the air induction system 82 of the diesel engine 76. Again, I regulate the pressure of gaseous fuel supplied while the engine is at its operating temperature and at idle with all auxiliary equipment turned off, for the smoothest running operation.

This range may be 15 to approximately 18.5 pounds per square inch. Under idling conditions the gaseous fuel flow rate is approximately 4.8 liters per minute.

The systems of FIGS. 1–5 may use liquified petroleum or compressed natural gas. The storage tanks 24 and 78 and regulator valve 60 being appropriately chosen for the gaseous fuel employed. Other gaseous fuels such as hydrogen may also be employed.

Figure 6:
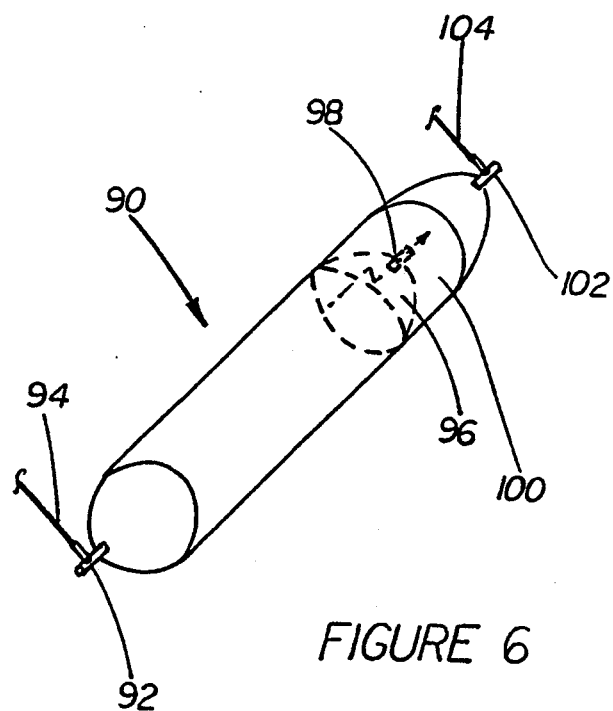
FIG. 6 is a diagrammatic view of the LP gas storage vessel shown in FIG. 1 with an internal expansion valve.

Now referring to FIG. 6, a special LP gas cylinder 90 according to my invention is supplied with the usual two-way fill and feed valve 92 connected to gaseous fuel line 94. Gaseous fuel line 94 is connected to a fill mechanism 30, such as illustrated in FIG. 1, and also to intake fitting 58 and regulator 60 of FIG. 5. In a conventional LP gas cylinder either valve 92 or another valve would release gaseous fuel to the atmosphere if the pressure in the tank 90 exceeded a predetermined limit. In order to recover some of the gaseous fuel that would otherwise be lost, I provide the cylinder 90 with a hemispherical shaped internal baffle 96 and a high pressure relief valve 98. This forms another chamber 100 within the cylinder 90 to which gaseous fuel which passes through relief valve 98 may be stored and supplied through valve 102 to another fuel line 104 which is also connected to fitting 58 to the control box 26 (FIG. 5). If the pressure within the additional storage area 100 exceeds a predetermined limit, and gaseous fuel is not flowing in fuel line 104, valve 102 will release gaseous fuel to the atmosphere when an excessive pressure is reached in the conventional manner.

However, by providing the expansion chamber 100, the gaseous fuel that is stored therein before the valve 102 opens is saved for use in the system.

Figure 7:
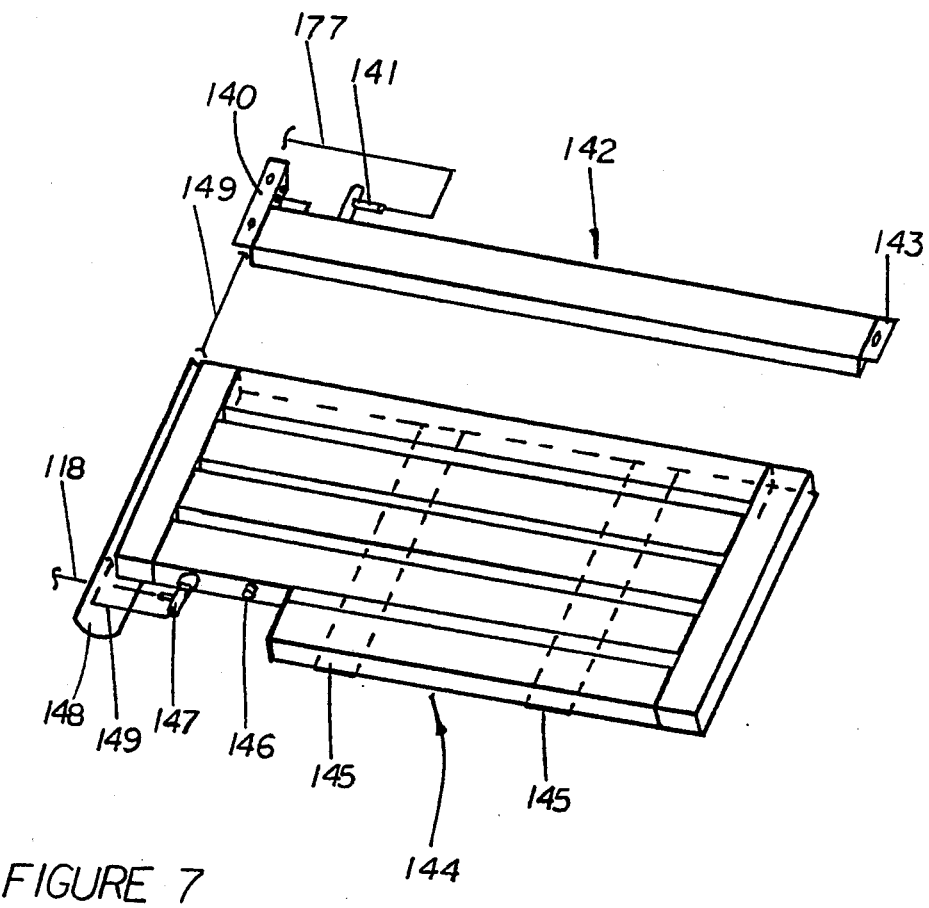
FIG. 7 is a diagrammatic view of an alternative flat liquified petroleum gas storage vessel with a separate expansion vessel for application underneath a vehicle.

Reference is now made to FIG. 7 which shows an LPG storage vessel generally indicated at 144 which can be used in the applications shown in FIGS. 1 through 5. LPG liquid gaseous fuel is filled through fuel fill line 118 through a two-way valve 147 into vessel 144, liquid or gaseous LPG from vessel 144 is fed back through two-way valve 147 through fuel line 118 when demanded by an external apparatus such as the system control module 26 (see FIGS. 1 and 5). As gas in storage vessel 144 expands it is relieved through valve 147 into fuel line 149 over to storage vessel 142. Gaseous fuel from storage vessel 142 is fed through valve 141 into fuel line 177 to an external apparatus such as system control module 26. Should high pressure gas build up in vessel 142 and not be allowed to flow through valve 141 into fuel feed line 177 to an external apparatus, such would be the case if system control module 26 were inoperative, or some other device inactive, high pressure gas would exit valve 141 to atmosphere via standard external relief mechanisms of valve 141. Should high pressure gas build up in vessel 144 and not be allowed to pass through valve 147, it will vent through relief port 146 to the atmosphere. Vessel 144 is held in place by brackets 145 attached to vessel 144 with curved impact bar 148 installed forward of vessel 144. Relief vessel 142 is held in place by brackets 140 and 143 fixed to vessel 142.

Figure 8:
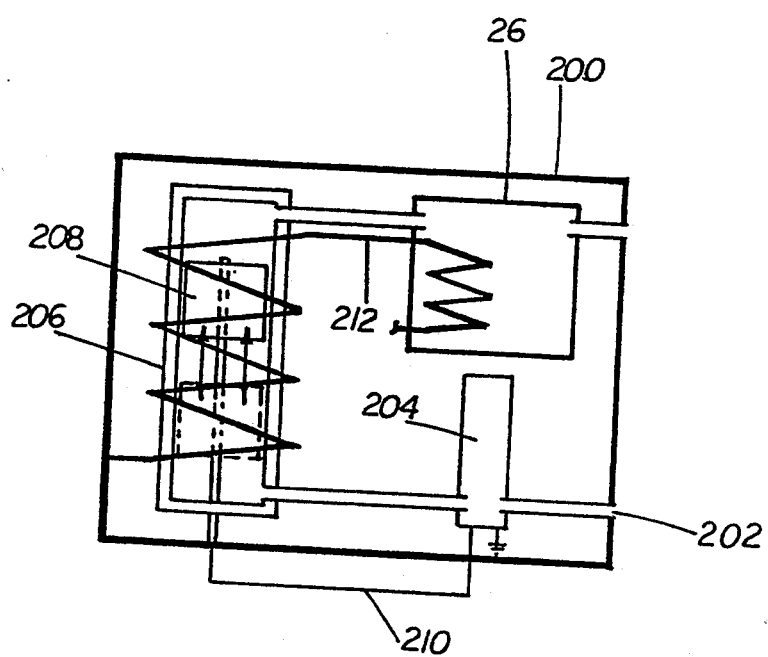
FIG. 8 is a diagrammatic view of a gasifier mechanism and control module that may be used in the invention.

Now referring to FIG. 8, when extremely cold operating conditions are encountered, the system may be provided with a gaseous fuel volatilizer in housing 200. Gaseous fuel is supplied by input fitting 202 to a solenoid operated valve 204. The gaseous fuel may, in extremely cold conditions, be liquid when passing through solenoid 204 and thus it is supplied to a chamber 206 arranged vertically as shown. Gaseous fuel in liquid form will rise in chamber 206 to a level which will raise a float switch generally indicated at 208, which is in series with the control line 210 to the solenoid valve 204. Thus, when the liquified gaseous fuel reaches a predetermined level in chamber 206, the flow will be cut off. Meanwhile the chamber 206 is heated by an electric heater generally indicated at 212 which volatilizes the fuel which may then be supplied to the system control module 26 which may also be heated by the electric heater 212.

Also, when operating in extremely cold conditions, an electric heating element 214 may be mounted on the expansion valve 60 of the control unit 26 (see FIG. 5).

Those skilled in the art will understand that the electric heaters 212 and 214 are thermostatically controlled and that they could be replaced by using a hot coolant line from the radiator of the vehicle on which the system is mounted.

Figure 9:
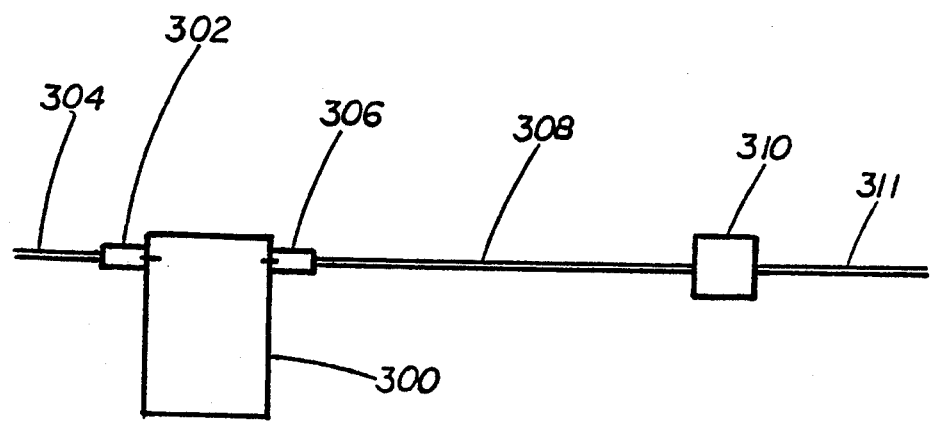
FIG. 9 is a diagram of an alternative embodiment of my invention showing the gaseous fuel directly injected into a combustion chamber; and, FIG. 10 is a diagram of another alternative embodiment of my invention showing the gaseous fuel being mixed with the liquid fuel and directly injected into a combustion chamber using a single injector.

Now referring to FIG. 9, the gaseous fuel could be directly injected into a cylinder 300 to which liquid fuel is supplied by injector 302 supplied by liquid fuel on line 304, by employing a second injector 306 supplied with gaseous fuel 308. It will be understood that in order to supply the gaseous fuel at a high enough pressure it might be necessary to employ a gaseous fuel pump 310. However, this is less necessary when the gaseous fuel is compressed natural gas. Another way of injecting gaseous fuel directly into a cylinder 300 is to use a single injector 312 to which a mixture of liquid and gaseous fuel is supplied on line 314. The liquid fuel is supplied via line 316 to the liquid fuel pump 318. The gaseous fuel is supplied on line 320 to a gaseous fuel pump 322, if required, and then to an appropriate mixer 324. Mixer 324 could be an appropriately formed labyrinthian mixing chamber, an ultrasonic whistle, or an energy supplied ultrasonic or mechanical mixer supplied with electric energy as indicated on electric line 326.

Figure 10:
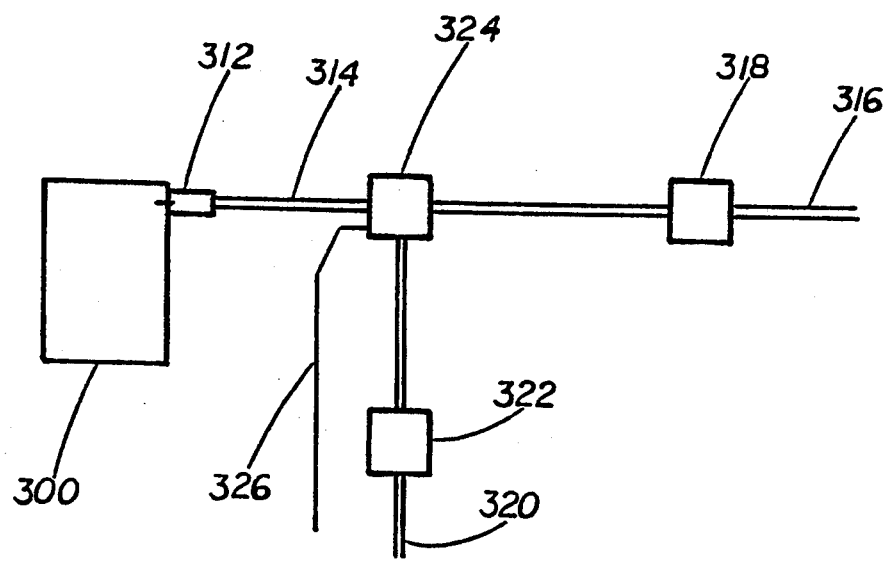

In both embodiments illustrated in FIGS. 9 and 10, the gaseous fuel is supplied at constant pressure to input lines 311 and 320 after passing through a control unit 26 (see FIG. 5), and a nearby solenoid valve 34 (see FIGS. 1 and 2).

When installed by a manufacturer, rather than connecting the solenoid valves 34 and 66 (FIGS. 1 and 5) to the thermostatic switch 38 and the alternator 20, the electric line 44 may be energized from the electronic control module 21. Thus, the solenoid valves 34 and 66 may be caused to open to supply gaseous fuel when the oxygen sensor 54 (FIG. 2) senses a predetermined amount of oxygen in the exhaust or when the engine is not in a cold start condition.

It will thus be seen that the objects set forth above among those made apparent from the preceding description are efficiently attained and, since certain changes may be made in carrying out the above methods, and the described articles, and in the constructions set forth without departing from the scope of the invention, it is intended that all matter contained in the above description (or shown in the accompanying drawings) shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. Apparatus for supplying a gaseous fuel supplement to an internal combustion engine primarily supplied with liquid fuel and oxygen when the supply of liquid fuel is controlled by a sensor sensing an engine operating condition, said apparatus comprising:

A first valve means having only a fully opened and a fully closed position and a gaseous fuel supply inlet and a gaseous fuel outlet connected to supply gaseous fuel therethrough at substantially constant pressure to said engine; and, B means for fully opening said first valve means to supply gaseous fuel at a substantially constant rate whenever said engine is running at or above normal idle.

2. Apparatus as defined in claim 1 wherein said engine operating condition is the speed of the engine.

3. Apparatus as defined in claim 1 wherein said engine operating condition is the amount of oxygen in the engine's exhaust.

4. Apparatus as defined in claim 1 wherein said engine comprises an exhaust oxygen sensor and said means for fully opening said valve is responsive to said oxygen sensor sensing a predetermined quantity of oxygen.

5. Apparatus as defined in claim 1 wherein said engine is under control of an engine control computer and said means for fully opening said valve is responsive to a signal from said engine control computer indicating that said engine is not in a cold start condition to cause said valve to open.

6. Apparatus as defined in claim 5 wherein said valve remains fully open until said engine is turned off.

7. Apparatus as defined in claim 1 wherein said engine comprises an intake manifold; and, C conduit means for connecting said outlet to said intake manifold.

8. Apparatus as defined in claim 1 wherein said engine comprises an air intake induction line; and, C conduit means for connecting said outlet to said air intake induction line.

9. Apparatus as defined in claim 1; and,

C means for sensing when said engine has reached a predetermined operating temperature, said means supplying a signal to said valve opening means to fully open said valve.

10. Apparatus as defined in claim 1 wherein the constant pressure at which said gaseous fuel is supplied to said engine is preset during engine idling at normal engine operating temperature to minimize engine noise.

11. Apparatus as defined in claim 10 wherein said gaseous fuel supplies about 20% of the energy to said engine when idling at normal operating temperature.

12. Apparatus as defined in claim 1; and,

C a gaseous fuel supply tank;

D a second valve means adjacent said fuel supply tank having only a fully opened and a fully closed position and a gaseous fuel supply inlet connected to said tank and a gaseous fuel outlet connected to supply gaseous fuel therethrough and responsive to said opening means as said first valve; and, E a gaseous fuel supply line from said outlet of said second valve to said inlet of said first valve, whereby said line is closed at each end when said engine is not running.

13. Apparatus as defined in claim 1 wherein said engine comprises a liquid fuel supply line; and,
  C conduit means for connecting said outlet to said liquid fuel supply line.

14. Apparatus as defined in claim 13; and,
  D mixing means for mixing gaseous fuel and liquid fuel in said liquid fuel supply line.

15. Apparatus as defined in claim 1; and,
  C means for injecting said gaseous fuel directly into a combustion chamber of said engine.

16. A method for utilizing both gaseous and liquid fuels in an internal combustion engine utilizing a primary fuel wherein the primary fuel induction quantity is controlled by a separate means and adjusted when the engine senses the richness of the fuel mixture, said method comprising supplying a substantially constant steady flow of gaseous fuel independent of engine load from a separate gaseous fuel reservoir at a preset pressure and feeding the gaseous fuel through an orifice to the air supply to the engine.

17. The method defined in claim 16 wherein said gaseous fuel is only supplied when the engine reaches its operating temperature.

18. A method for utilizing both gaseous and liquid fuels in an internal combustion engine utilizing a primary fuel wherein the primary fuel induction quantity is controlled by an engine speed governor said method comprising supplying a substantially constant steady flow of gaseous fuel independent of engine load from a separate gaseous fuel reservoir at a preset pressure and feeding the gaseous fuel through an orifice to the air supply to the engine whenever the engine is running at or above normal idle.

19. A method for utilizing both gaseous and liquid fuels in an internal combustion engine utilizing a primary fuel wherein the primary fuel induction quantity is controlled by a separate means and adjusted when the engine senses the richness of the fuel mixture, said method comprising supplying a substantially constant steady flow of gaseous fuel to the engine independent of engine load from a separate gaseous fuel reservoir at a preset pressure.

20. A method for utilizing both gaseous and liquid fuels in an internal combustion engine utilizing a primary fuel wherein the primary fuel induction quantity is controlled by an engine speed governor, said method comprising supplying a substantially constant steady flow of gaseous fuel to the engine independent of engine load from a separate gaseous fuel reservoir at a preset pressure whenever the engine is running at or above normal idle.

* * * * *